United States Patent [19]

Leyden

[11] Patent Number: 5,719,763
[45] Date of Patent: Feb. 17, 1998

[54] FREQUENCY INJECTOR MOTION CONTROLLER

[75] Inventor: Robin D. Leyden, Canoga Park, Calif.

[73] Assignee: Universal City Florida Partners, Orlando, Fla.

[21] Appl. No.: 714,879

[22] Filed: Sep. 17, 1996

Related U.S. Application Data

[63] Continuation of Ser. No. 188,941, Jan. 28, 1994, abandoned, which is a continuation of Ser. No. 790,252, Nov. 8, 1991, abandoned.

[51] Int. Cl.$^6$ .............................. G09B 9/00; G05B 19/02
[52] U.S. Cl. ......................... 364/167.01; 360/79; 434/62; 434/58
[58] Field of Search ........................... 364/167.01, 183, 364/431.02; 318/610, 608, 568.11; 388/809–815; 369/70; 360/79; 434/58–62, 55, 69; 472/58–61, 130; 352/85, 132

[56] References Cited

U.S. PATENT DOCUMENTS

| | | | |
|---|---|---|---|
| 3,767,901 | 10/1973 | Black et al. | 360/79 |
| 3,932,794 | 1/1976 | Iwako | 388/814 |
| 4,476,420 | 10/1984 | Asakowa | 318/608 |
| 4,845,216 | 7/1989 | Scholl et al. | 364/183 |
| 4,845,416 | 7/1989 | Scholl et al. | 364/183 |
| 5,031,398 | 7/1991 | Lampe et al. | 364/431.02 |

*Primary Examiner*—Reba I. Elmore
*Assistant Examiner*—Steven R. Garland
*Attorney, Agent, or Firm*—Lyon & Lyon LLP

[57] ABSTRACT

A high frequency injection system overlays a textured signal onto a digital control signal for controlling a motion base. The system includes a digital motion controller and HFIS generator linked to a mixer. A mixed signal from the mixer is amplified and provided to a valve for controlling an actuator for moving a motion base.

11 Claims, 6 Drawing Sheets

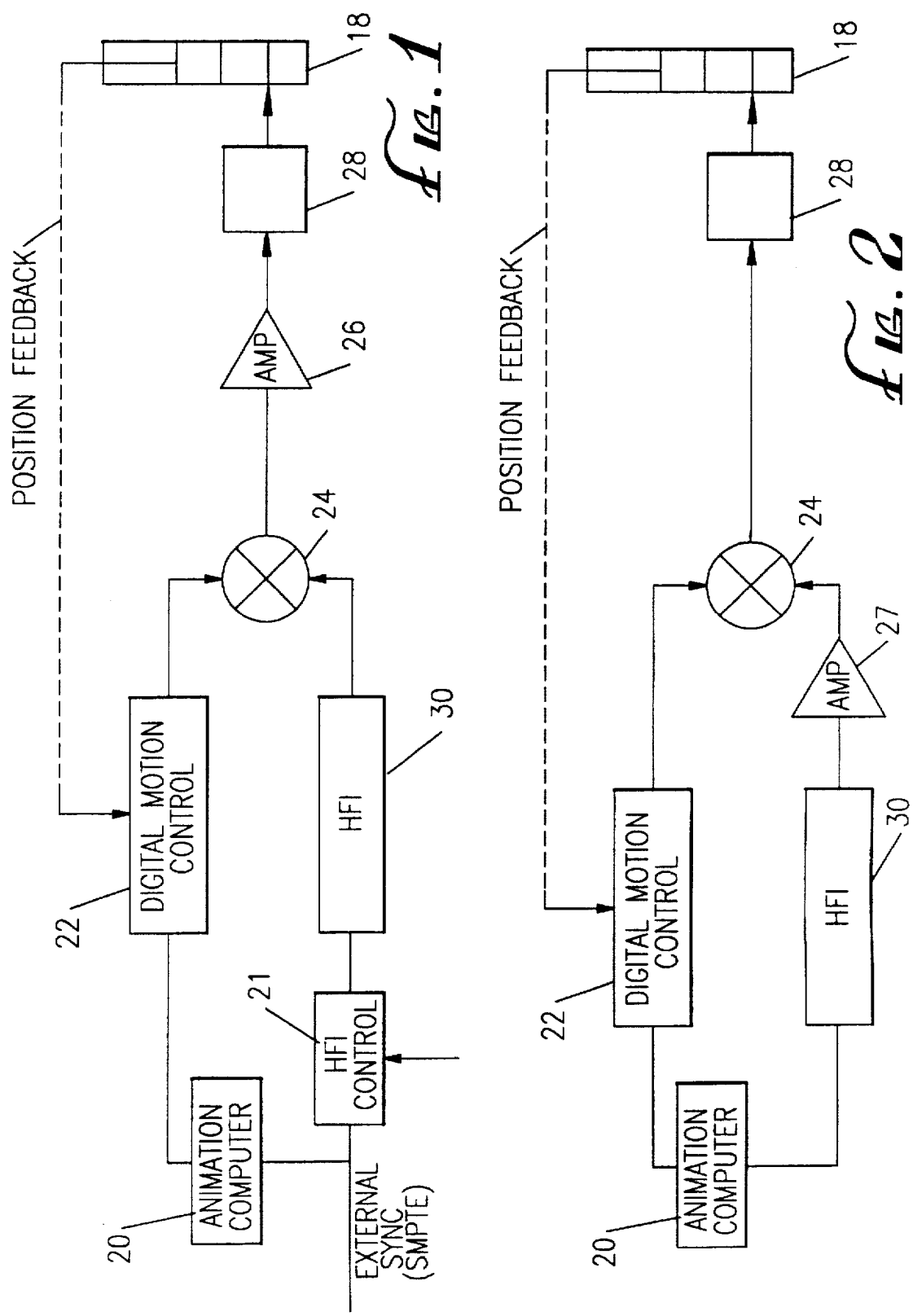

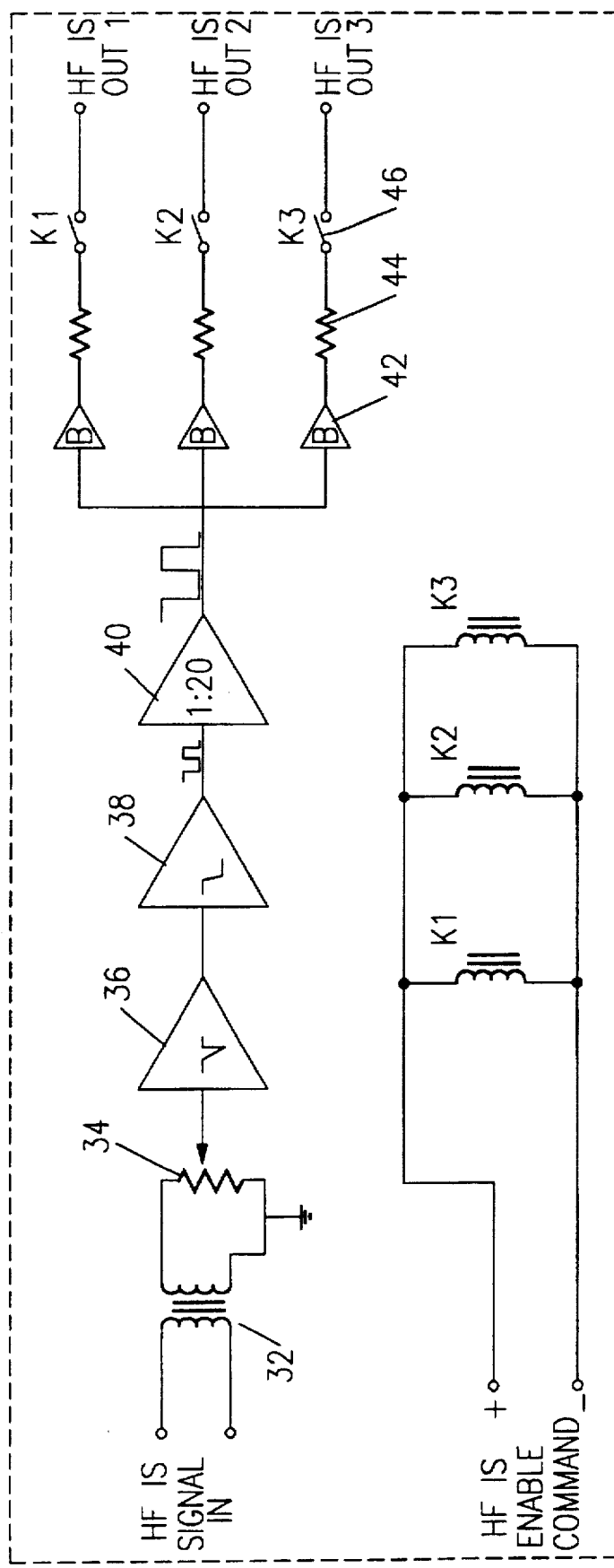
Fig. 5
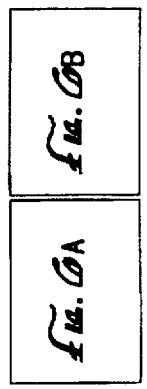
Fig. 6 | Fig. 6A | Fig. 6B

FREQUENCY INJECTOR MOTION CONTROLLER

This application is a Continuation of Ser. No. 08/188,941 filed Jan. 28, 1994, now abandoned, which is a Continuation of Ser. No. 07/790,252, filed on Nov. 8, 1991, now abandoned.

FIELD OF THE INVENTION

The field of the invention is motion controllers.

BACKGROUND OF THE INVENTION

Motion controllers are widely used in industrial, military, entertainment and other applications. Motion controllers generally electronically control actuators or positioners such as hydraulic or pneumatic cylinders, motors, etc. These motion controllers accordingly can control both the velocity, acceleration and direction of motion, and also positioning, through the use of sensors and feedback. Among the entertainment applications for motion controllers, theme park simulation rides or attractions commonly use a motion base moved or shifted in space by actuators. See, for example, U.S. Pat. No. 5,492,247 (incorporated herein by reference) which describes an attraction having a motion base supporting a vehicle within a theatre. Passengers are seated in the vehicle on the motion base which is raised, lowered, tilted and accelerated in correspondence with visual images projected on a theatre screen in front of the riders.

In the past, controllers for a motion base have typically applied traditional analog control system technologies. While these known systems provide exceptional response for the motion base, they are generally primitive in their self-monitoring ability and shut down when failures occur. Often, failures in such known analog systems result in motion base travel movement far exceeding established safety criteria. These failures can create unpredictable sudden movements possibly resulting in equipment damage, or in an entertainment setting, discomfort to the riders.

Accordingly, the trend in motion controllers has been away from analog control to digital control for motion base operations. Unlike their analog counterparts, digital systems are microprocessor controlled. With digital systems, movement accuracy to 1/1000th of an inch are typical with accelerations, decelerations and velocities tightly controlled. Digital systems also have extensive self-monitoring ability and can shut down when a possible failure is detected, usually with no movement of the motion base. In addition, digital control systems are extremely stable and do not drift in calibration as do analog systems.

On the other hand, digital control systems, by the nature of their design, cannot provide fast sudden moves for a motion base. Such moves are typically unobtainable with digital control systems because a fast sudden move is generally detected by the digital control system as a velocity violation, i.e., as a failure causing the motion base to move too quickly. Such digital control systems generally do not have the capability to distinguish or realize that a fast sudden move of a motion base for over e.g., an inch or two is acceptable, while the same movement over a greater distance is not acceptable.

Another disadvantage with digital control systems, in entertainment applications, relates to the animation computer system which provides the motion profile for the motion base controller. The animation computer system is typically designed around animation philosophies which output a finite motion command every 1/24th or 1/30th of a second. With these relatively slow information rates, commands to move the motion base repetitively, for example, 30 times a second, are not possible.

For increased realism in entertainment applications using a motion base controlled by a digital control system, it has now been realized that it is advantageous to provide a definitive texture or feel to an existing motion base movement profile. The movement texture greatly increases the believability of the effect, making for a more entertaining ride. A desired texture might be the sensory effects (audio and tactile) of an on-board engine starting or revving up, a wheeled vehicle rolling over cobblestones, gravel, etc. or the vehicle bumping or scraping against an object or surface. Sudden explosions and shock impacts might also be desired.

Although analog control systems may be able to provide such desired texture to motion base movement, the response of a motion base to such analog controlled systems is potentially unreliable. On the other hand, while digital control systems for a motion base are extremely safe and reliable, they cannot produce the desired textured motion base movement.

Accordingly, it is an object of the invention to provide an improved motion controller.

It is another object of the invention to provide a digital motion controller system which can produce a textured movement of a motion base.

Other and further objects will appear hereinafter.

SUMMARY OF THE INVENTION

To these ends, a motion controller includes a mixer linked to a digital motion controller and a high frequency injector generator. An amplifier amplifies an output signal from the mixer which directly or indirectly controls an actuator.

A method for controlling motion, and preferably for providing a textured motion or movement to a motion base preferably includes the steps of generating an analog primary motion control signal and converting it to a digital primary motion control signal. A high frequency injection signal or secondary signal is also advantageously generated and mixed with the digital motion control signal, to create a mixed signal. The mixed signal is amplified and used to control an actuator system directly, or to control a valve which controls an actuator linked to the motion base. Accordingly, a movement texture or feel is superimposed over the basic movement provided by a traditional digital motion control system.

The present apparatus and method for motion control, when applied to control of a motion base in an entertainment setting, is referred to as a high frequency injection system or HFIS. A principle of HFIS is that motion textures that can be sensed by the individuals or passengers on a motion base are changes of position that are velocity and acceleration intensive, rather than positional. Accordingly, the criteria for applying a texture to a motion requires extensive velocity and acceleration variations, but not large positional deviations. An actual movement of the motion base need only be fractions of an inch to be properly perceived by the passengers as the desired vibration, jarring, etc.

Since motion base systems are generally designed to permit positional deviations of several inches without faulting, this minor positional deflection is essentially inconsequential.

BRIEF DESCRIPTION OF THE DRAWINGS

In the drawings, wherein similar reference characters denote similar elements throughout the several views:

FIG. 1 is a schematic illustration of an external synchronization example of the present HFIS system;

FIG. 2 is a schematic illustration of a pre-amplification embodiment;

FIG. 5 is a schematic illustration of a typical HFIS driver module;

DETAILED DESCRIPTION OF THE DRAWINGS

In a preferred embodiment of the present system, a standard digital servo positioning system is used. Such standard designs are available from Allen-Bradley, Gallil, Delta Tau, MTS, Creonics, and many other manufacturers.

Figure 3:
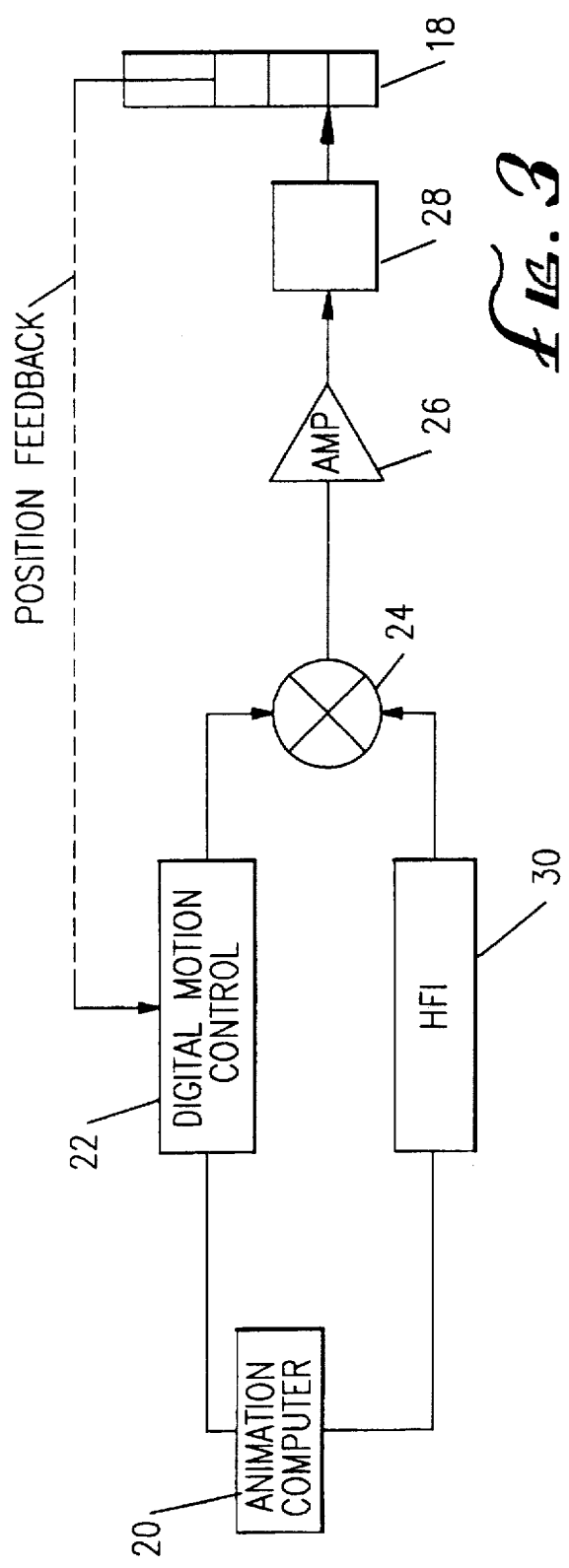
FIG. 3 is a schematic illustration of a post amplification embodiment.

As shown in FIGS. 1, 2 and 3, an HFI drive module 30 and a digital motion controller 22 (of the type described above) are linked to a animation computer 20 and a mixer 24. An external SMPTE (Society of Motion Picture and Television Engineers) or VITC (Vertical Interval Time Code) synchronization signal is provided to the animation computer 20 and an HFI control 21. The HFI control 21 also receives an HFI input signal from e.g., a video disk (as described below) and provides an HFI output control signal to the HFI drive module 30. The mixer 24 is linked to a valve 28 controlling an actuator 18. As shown in FIGS. 1 and 3, an amplifier 26 amplifies the signal from the mixer 24 going into the valve 28. The signal mixer 24 mixes texture commands (or the HFIS signal) from the HFIS drive module 30, and a motion profile signal from the digital motion controller 22. The motion profile signal provides for the basic "non-textured" movements of a motion base.

The generation of the HFIS signal is accomplished in several ways. Firstly, since the signal is directly translated into motions, it has been found that the nature and shape of the waveform of the HFIS signal significantly affects the resultant feeling experienced on the motion base. It is therefore necessary that the HFIS generator be capable of virtually producing any manner of waveform desired, with maximum flexibility in waveshape, waveform, and amplitude. Further, it should also be capable of running as an independent system, or being synchronized with the animation computer which is providing the basic motion commands for the digital system.

Since even the fastest HFIS commands are found to be most effective in frequency ranges under 1000 Hz., it has been found that the HFIS signals are very similar in properties to that of conventional audio signals, in that they can be stored and reproduced by the same type of equipment.

Since the waveforms are varied and convoluted in nature, (i.e. comprising variable combinations of sine, square, sawtooth, etc. waves) traditional signal generators, although useful in principle, have been found to be inadequate for these application. Modem music emulators however, are specifically designed to synthesize and alter waveforms within the audio range and are advantageously used in creating the needed waveforms. The HFIS signals are therefore "choreographed", much like a composer composes music, and mapped out in detail. Once composed, the HFIS signals are then created and assembled, just as a musician creates music, using the same emulators, mixers, and recording techniques.

Eventually, the final HFIS "orchestration" is assembled on a work tape, ready to be transferred to its final playback medium that will be used on the motion base system. The exact medium depends on the application.

Figure 4:
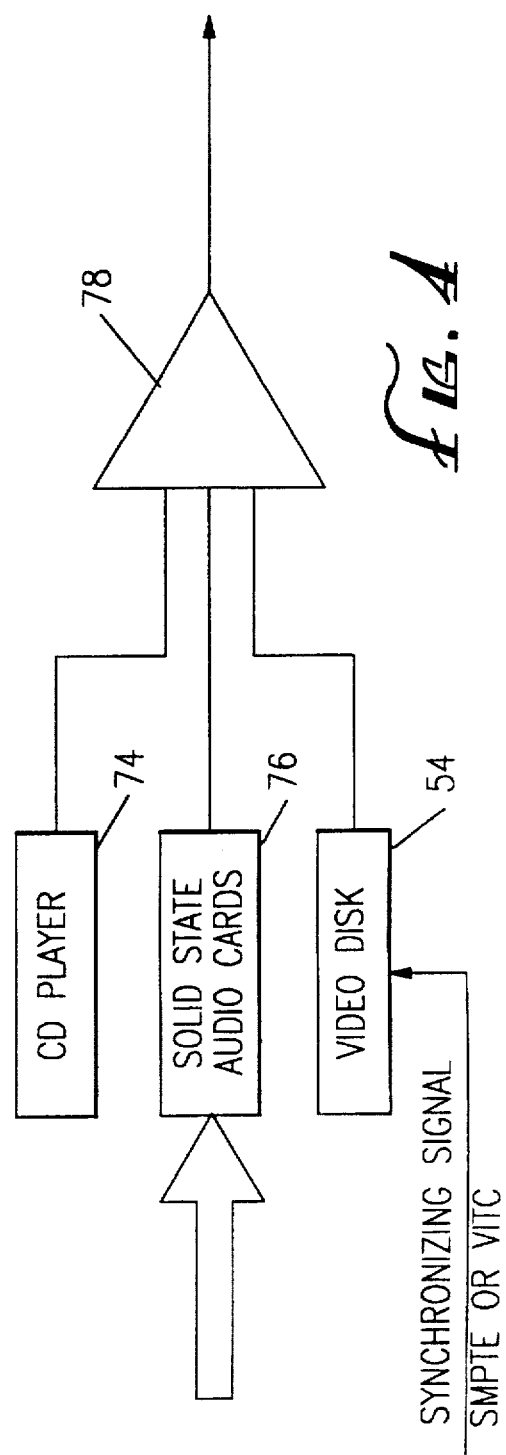
FIG. 4 is a schematic illustration of the HFIS linked to various media.

If the texture is to be a random background effect, in a way similar to background music in a theme park, the HFIS signals are transferred to Compact Disk (CD) and as shown in FIG. 4, a traditional CD player 74 is used as the playback medium. The reproduced HFIS signal is then mixed with the underlying motion profile signal in the signal mixer 24 or a mixer preamplifier 78. If the texture is to occur infrequently at a few precise points in the program, the HFIS signal may be digitally stored onto solid state audio cards 76, which playback short programs upon cued command.

If there is extensive "texturizing" of the moves throughout the program, and/or the texture must be precisely synchronized with the basic move profile, and/or the texture must be synchronized with another medium (such as film or video), then the HFIS signal may be transferred to an audio track of a conventional Videodisk system 54 and synchronized with the various techniques normally used, such as SMPTE Time Code and VITC.

Figure 7:
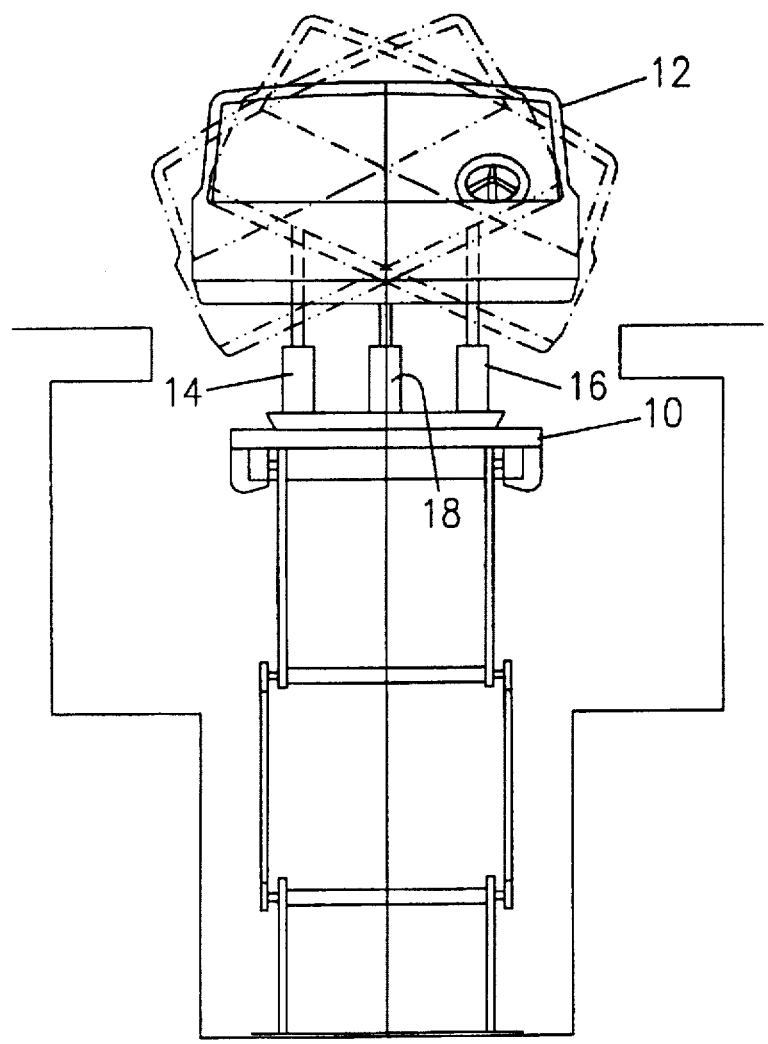
FIG. 7 is a schematic illustration of a motion base associated with the application of FIG. 6.

As shown in FIG. 5, within the HFIS driver module 30, a HFIS signal (which consists of waveforms varying in shape and intensity) is provided to an input transformer 32. The HFIS signal is provided in a 600 ohm balanced-line format. An adjustment potentiometer 34 is used to increase or decrease HFIS signal strength to allow specific adjustments of the signal for the motion base 10 which the module 30 controls. The HFIS signal is then passed through an optional notch filter 36 which selectively removes certain frequencies. For example, if the structure supporting the motion base 10 (as shown in FIG. 7) has a natural resonant frequency of 10 Hz, the notch filter 36 is selected to filter out the 10 Hz frequency, to avoid resonance. The frequency(s) to be filtered out will vary with specific applications. If several frequencies need to be filtered out, additional notch filters can be added for each frequency.

Figure 6A:
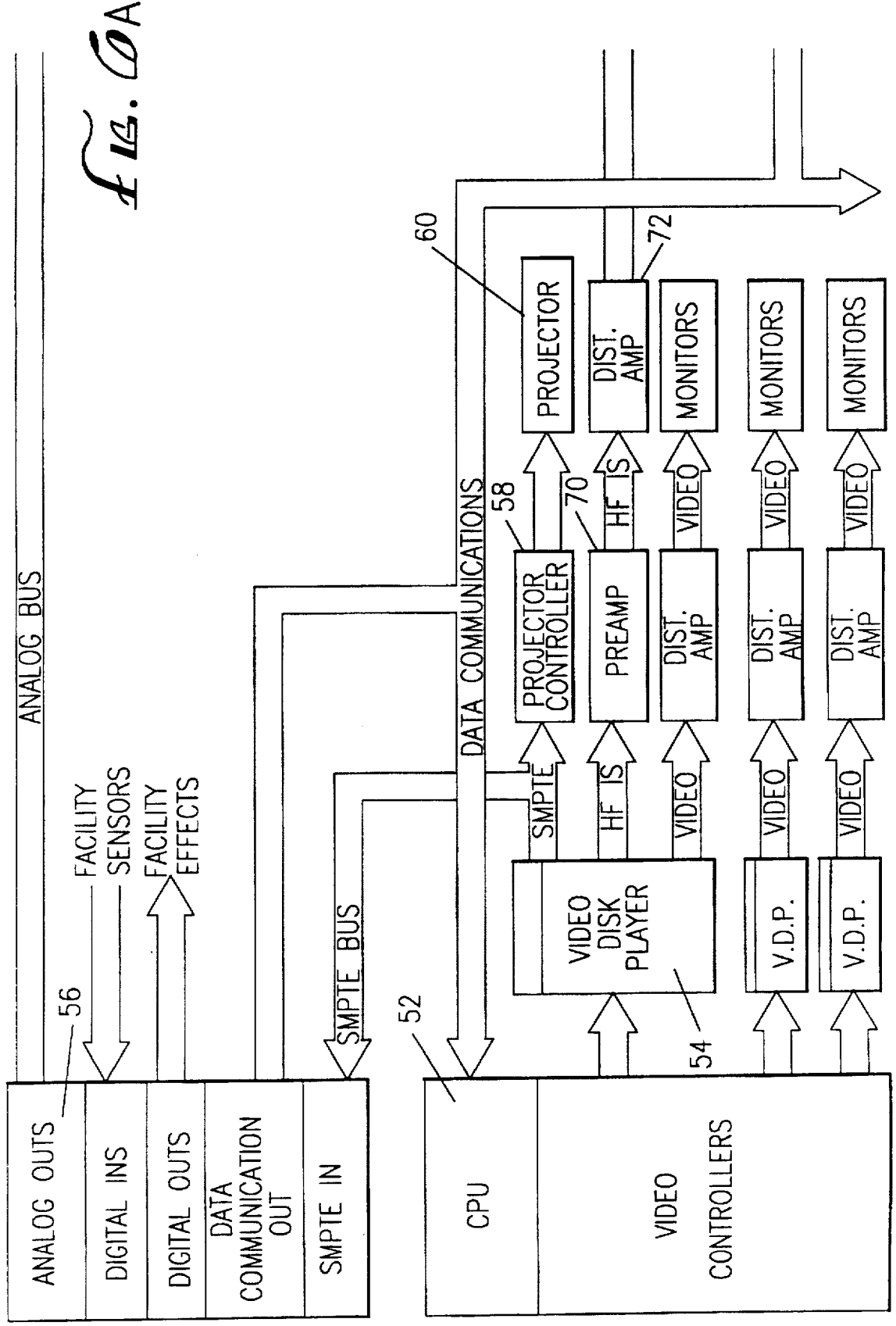
FIG. 6 is a diagram of an HFIS application for a motion base in a ride attraction entertainment setting.
Figure 6B:
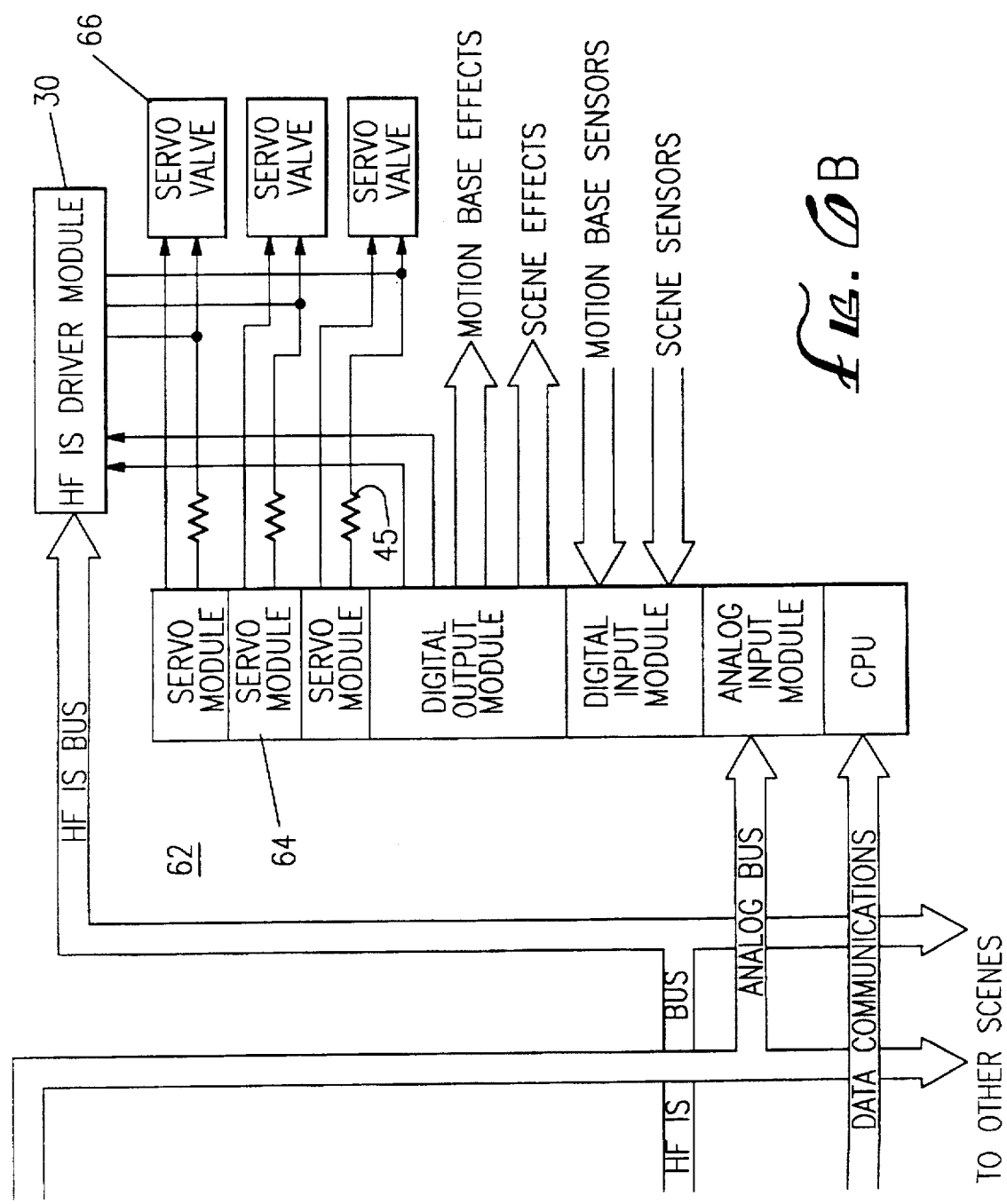

The HFIS signal passes through the notch filter 36 and is routed through a low pass filter 38 which eliminates any frequencies above a selected threshold, for example, any frequencies exceeding 500 Hz. Since any frequencies above the threshold value are beyond the scope of the HFIS, the low pass filter 38 removes unwanted harmonics and other signal anomalies. The remaining components of the HFIS signal are passed from the low pass filter 38 to an amplifier 40 where the signal amplitude is increased to, e.g., 20 times its input level. This brings the HFIS signal up to levels that maybe applied to hydraulic servo valves 66 which control the actuators. (FIG. 6).

After amplification, the HFIS signal is routed to three buffer-type distribution amplifiers 42 to allow the same signal to power three separate output loads, one for each actuator driving the motion base. Each buffer amplifier 42 passes its HFIS signal through mixing resistors 44 to the contacts of an enable relay 46. The enable relay 46 has the ability of injecting the HFIS signal into the hydraulic servo valves 66 upon demand, through an HFIS enable command. The presence of this command signal applies the HFIS signal into the valve 66, where it is combined with the motion profile signal being provided to the valve 66 by the digital motion control system 22. Absence of the command signal results in opening of the relays 46, thus disconnecting the HFIS signal from valves 66.

FIG. 7 illustrates an application of a HFIS in an amusement or theme park attraction. As described in detail in U.S. Pat. No. 5,492,247, the attraction includes a theatre having several motion bases facing a curved screen. The motion bases are hydraulically operated accompanied with multimedia effects such as video playback, film projection, lighting, sound and visual effects.

The motion base 10 supports a vehicle 12 on three actuators, a front left actuator 14, a front right actuator 16 and a rear actuator 18. Typically one HFIS module 30 is used to control all three actuators on a single motion base, although other designs are possible. The actuators 14, 16 and 18, with proper interaction, provide pitch, roll, yaw and elevation movements to the vehicle 12.

FIG. 6 illustrates a preferred arrangement of the HFIS driver module 30 in an amusement ride attraction embodiment. Depending on existing conditions, an animation controller 56 activates a show interface system 52 which starts various video disks players. The main video disk player 54, in addition to its traditional video material, also holds SMPTE Time Code information, as well as HFIS signals on its auxiliary tracks. When the SMPTE Time Code begins, both the animation controller 56 and the projector controller 58 start up and lock into synchronization. The projector controller 58 operates the film projector 60 synchronizing the film through the projector 60 with the overall show. Other audio, video, and facility effects (e.g., lights, doors, signs, steam or smoke, etc.) may be locked to the SMPTE code by the animation controller 56, with or without critical event controller/interrupters.

Simultaneously, the animation controller 56 distributes show signals to the digital motion controllers 22 (to control movement of the motion base). Analog signals generated by the animation controller 56 are routed to the scenes by an analog bus. The analog signals contain position and movement information for the motion bases 10. Analog input modules within the Scene PLC 62 convert these signals to digital signals.

The motion base positioning information is received at each scene PLC 62 where it is qualified and routed to the motion base hydraulic valves 66 as a motion profile signal through servo modules 64. The servo modules 64 provide a fluctuating/reversing DC signal output which causes the servo valves to open and close to control the actuators. This arrangement provides the general overall movement profile of the motion base 10. In this application, the three servo valves 66 operate the three actuators 14, 16 and 18 under the motion base 10 which are arranged in a tripod configuration to provide vertical lift and tilt in all directions. Since the video disk player 54 is in absolute synchronization with the animation controller 56 through the SMPTE interlock, the HFIS signal recorded on the video disk within the video disk player 54 is also in synchronization with the overall show.

The HFIS signal is passed from the video disk player 54 to a preamplifier stage 70 where its signal is boosted to line level, approximately one volt peak-to-peak. The HFIS signal is then passed to a distribution amplifier 72 where it is routed to multi HFIS driver modules 30. As shown in FIG. 6, one HFIS driver module 30 operates one motion base 10 in a single scene 62.

The HFIS signal is routed into the driver module 30 input where it is processed as shown in FIG. 5. The HFIS signal, which generally has an amplitude much less than the motion profile signal, is then applied to the servo valves 66, mixing with the motion profile signal provided by the servo modules 64. The servo valves are responsive within the HFIS frequency range which for an amusement ride application range up to about 500 Hz, but can be higher for other applications.

The application of the HFIS signal to the servo valves 66 is qualified or switched by operation of the HFIS enable command, which is provided by the local scene PLC 62. Each scene PLC 62 monitors each particular motion base 10 and ensures that conditions are appropriate for application of the HFIS signal. Although FIG. 6 illustrates a single scene within an attraction, through the data communications bus, analog bus, and HFIS bus, the system may be distributed to as many scenes and motion bases as desired. While the foregoing embodiments and examples are described as applications for a motion base in an entertainment or amusement ride setting, the use of the present HFIS is not restricted to motion bases and applies to any application requiring precise positioning, and then minute rapid deviations of that position. Similarly, the present HFIS is not limited to control of hydraulic systems but applies to any moving media capable of responding to the HFIS band width which, depending on the application, can exceed 1000 Hz. While various media devices such as CD players and video disks have been shown and described for use with the present HFIS, other audio equipment, for example, synthesizers and emulators can be used. Thus, while several embodiments have been shown and described, it would be apparent that other modifications and applications are possible without departing from the spirit and scope of the present invention.

I claim:

1. A motion controller comprising:

a digital motion controller providing a prerecorded digital motion control signal;

an analog high frequency injector providing a prerecorded analog high frequency signal;

a mixer electrically coupled to both the digital motion controller and the analog high frequency injector and combining the digital motion control signal and the analog high frequency signal simultaneously to create a mixer output signal;

an amplifier electrically linked to the mixer to receive the mixer output signal; and an actuator electrically linked to the amplifier and to a motion base of an amusement ride attraction.

2. The motion controller of claim 1 further comprising a motion base supported by the actuator.

3. The motion controller of claim 1 further comprising an audio device selected from the group consisting of synthesizer, emulators, CD players, tape players, video disk players, and solid state audio, linked to the analog high frequency injector.

4. The motion controller of claim 1 further comprising an external time code synchronizer linked to the digital motion controller and analog high frequency injector.

5. The motion controller of claim 4 wherein the synchronizer is a SMPTE or VITC synchronizer.

6. The motion controller of claim 1 further comprising a servo valve linked to the actuator and amplifier.

7. A method of controlling motion of a motion base in a ride attraction comprising the steps of:

generating a digital motion control signal;

generating a high frequency injection signal;

synchronizing the digital motion control signal and the high frequency injection signal;

mixing the digital motion control signal and the high frequency injection signal to create a mixed signal;

amplifying the mixed signal; and supplying the mixed signal to an actuator to move the motion base.

8. A method of controlling motion of a motion base in a ride attraction comprising the steps of:

recording a motion texture signal with a recording device;

generating a high frequency injection signal;

generating a digital motion control signal;

mixing the digital motion control signal and the high frequency injection signal to create a mixed signal;

amplifying the mixed signal;

supplying the mixed signal to an actuator; and moving the motion base in correspondence with the mixed signal.

9. The method of claim 8 further comprising the step of controlling a valve mechanically connected to the actuator using the mixed signal.

10. The method of claim 8 further comprising the step of generating the motion texturing signal using a music emulator.

11. The method of claim 8 wherein the recording device is a member selected from a compact disk, solid state audio cards, and a video disk system.

* * * * *